United States Patent [19]

Sorensen

[11] 4,381,275
[45] Apr. 26, 1983

[54] STABILIZED CORE INJECTION MOLDING OF PLASTIC

[75] Inventor: Jens O. Sorensen, Rancho Santa Fe, Calif.

[73] Assignee: Trade Finance International, Georgetown, Cayman Islands

[21] Appl. No.: 230,302

[22] Filed: Jan. 30, 1981

[51] Int. Cl.³ .............................................. B29F 1/00
[52] U.S. Cl. ............................ 264/328.8; 264/328.13
[58] Field of Search ........................ 264/328.8, 328.13

[56] References Cited

U.S. PATENT DOCUMENTS

| | | | |
|---|---|---|---|
| 3,626,051 | 12/1971 | Liavtaud | 264/328.8 X |
| 3,995,008 | 11/1976 | Spiegelberg | 264/328.8 |
| 4,014,972 | 3/1977 | Rentz | 264/328.8 X |
| 4,201,209 | 5/1980 | LeVeen | 264/328.8 X |
| 4,264,295 | 4/1981 | Hingley | 264/328.8 X |

*Primary Examiner*—Thomas P. Pavelko

[57] ABSTRACT

A method and a system for stabilizing the core of a mold when injection molding plastic, wherein each production cycle comprises the steps of:
(a) injecting a first plastic through a first gate into a chilling cavity with a core so that the cavity is not filled.
(b) cooling the injected first plastic in the chilling cavity to thereby solidify the first plastic.
(c) injecting, subsequent to injecting the first plastic, but not necessarily subsequent to the first plastic becoming completely solidified, a second plastic through a second gate into the chilling cavity whereby the cooled injected first plastic impedes any movement of the core caused by injecting the second plastic and whereby the injected second plastic fills the cavity and fuses with the previously injected plastic.
(d) cooling the injected second plastic in the chilling cavity to thereby solidify the fused unit.
(e) ejecting the solidified molded unit.

9 Claims, 2 Drawing Figures

STABILIZED CORE INJECTION MOLDING OF PLASTIC

FIELD OF THE INVENTION

This invention generally relates to injection molding of hollow plastic products and is particularly directed to stabilizing the core of the mold. The core is the mold part which forms the interior of a concave or hollow molded product.

DISCUSSION OF PRIOR ART

Heretofore, it has been a great problem to stabilize the core of molds used for injection molding hollow products of plastic with thin walls such as test tubes, drinking glasses, flower pots, and pipes. In order to injection mold such products a large injection pressure is necessary which causes the core part of the mold to move in relation to the rest of the mold, resulting in products which do not have the intended dimensions.

Until now no practical solution has been found to the problem and, therefore, such products as mentioned above are usually produced at a larger wall thickness than is necessary for the purpose of the product. The larger wall thickness causes lower injection pressure to be necessary, which puts less strain on the core part of the mold.

OBJECTS OF THE INVENTION

It is, therefore, the object of this invention to disclose a method and a system of injection molding of hollow plastic products with thin walls which is functioning so that the core is stabilized, so that it is possible to produce hollow plastic products with thin even wall thickness, or other desired dimensions.

SUMMARY OF THE INVENTION

A method and a system for stabilizing the core of a mold when injection molding plastic wherein each production cycle comprises the steps of:

(a) injecting a hot molten first plastic through a first gate into a chilling cavity with a core so that the cavity is not filled and so that the injected plastic does not obstruct injection from a second gate.

(b) cooling the injected first plastic in the chilling cavity to thereby solidify the first plastic.

(c) injecting, subsequent to injecting the first plastic, but not necessarily subsequent to the first injected plastic becoming completely solidified, a molten second plastic through the second gate into the chilling cavity whereby the cooled injected first plastic impedes any movement of the core caused by injecting the second plastic and whereby the injected second plastic fills the cavity and fuses with the previously injected plastic.

(d) cooling the injected second plastic in the chilling cavity to thereby solidify the fused unit.

(e) ejecting the solidified molded unit.

Further objects and advantages of my invention will become apparent from a consideration of the drawings and ensuing description thereof.

DETAILED DESCRIPTION OF THE DRAWINGS

Figure 1:
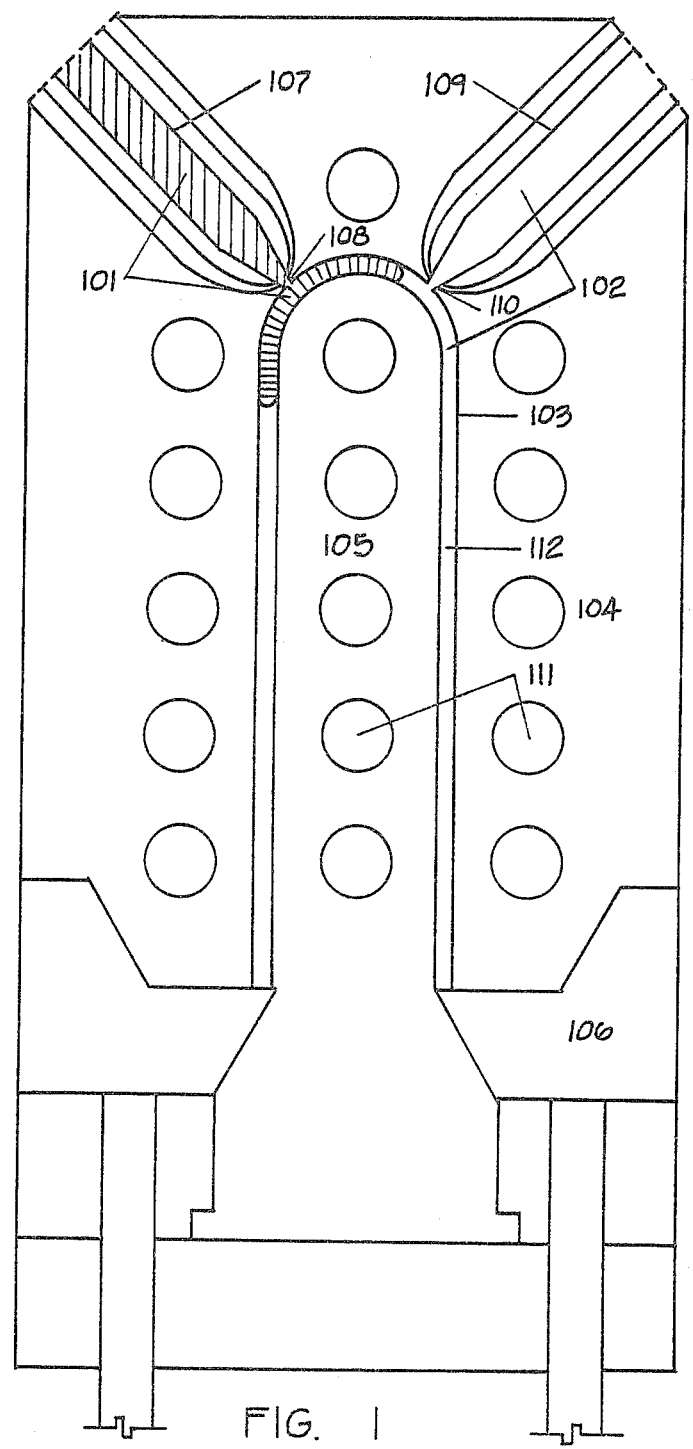
FIGS. 1 and 2 illustrate schematic cross-sectional views of subdivisions of molds for injection molding of plastic of this invention. The subdivisions are positioned traditionally in molds for traditional injection molding. The molded product is in both Figures a test tube.

FIG. 1.

This figure illustrates a chilling cavity 103 enclosed by a cavity part 104, a core part 105 which is centrally positioned in relation to the cavity part 104, and an ejector sleeve 106. A first hot runner 107 with a first restriction gate 108 leading to the chilling cavity 103 and a second hot runner 109 with a second restriction gate 110 also leading to the chilling cavity 103. Both the cavity part 104 and the core part 105 contain a cooling system 111. A first plastic 101 such as polystyrene is positioned in the hot runner 107 and part of the chilling cavity 103. A second plastic 102 also such as polystyrene, is positioned in the hot runner 109 and the remainder of the chilling cavity 103. The part of first plastic 101 and the second plastic 102 which is positioned in the chilling cavity 103 makes up a molded product 112.

The operation of a first preferred embodiment of this invention as illustrated in FIG. 1 is as follows: a production cycle is started by injecting a hot molten first plastic 101 from the first hot runner 107 through the first restriction gate 108, thereby entering the chilling cavity 103. The injection pressure of the hot molten first plastic 101 is adjusted at a low level so that the cavity 103 does not fill up and so that the injected first plastic 101 does not obstruct injection from the second restriction gate 110. The injected first plastic 101 is cooled by the cooling system 111, but before the injected first plastic 101 is completely solidified, a hot molen second platic 102 is injected from the second hot runner 109 through the second restriction gate 110 and thereby also enters the chilling cavity 103. The injection pressure of the hot molten second plastic 102 is adjusted at a higher level than the low level of the injection pressure of the hot molten first plastic 101 whereby the injected second plastic 102 fills the cavity and fuses with the previously injected first plastic. When the hot molten first plastic 101 was injected into the chilling cavity 103, the injection pressure was adjusted at a low level, but even at this low level of injection pressure, the injected first plastic 101 causes a slight movement of the core part 105 away from the first restriction gate 108 in relation to the cavity part 104, but since the second hot molten plastic 102 is injected before the injected first plastic is completely solidified, the core is forced back to its original central position by the higher level injection pressure of the injected second plastic 102. As the core is forced back, the cooled not completely solidified injected first plastic 101 impedes the movement of the core part 105 caused by the higher level injection pressure of the injected second plastic 102. Also since the hot molten second plastic 102 is injected before the injected first plastic 101 is completely solidified, the injected first plastic 101 fuses better with the injected second plastic 102 and time is saved in the production cycle since it is not necessary to wait with injecting the hot molten second platic 102 until the injected first plastic 101 is completely solidified. Both the first injected plastic 101 and the second injected plastic 102 are cooled in the chilling cavity 103 by the cooling system 111, thereby creating a solidified fused molded product 112. The molded product 112 is ejected by the ejector sleeve 106 in the traditional manner for injection molding. The production cycle is hereafter repeated. It is possible in some other embodiment to have two or more differently placed restriction gates taking the function of the second restriction gate 102.

FIG. 2.

This figure illustrates a chilling cavity 213 enclosed by a cavity part 204, a core part 205 which is centrally positioned in relation to the cavity part 204, and an ejector sleeve 206. A hot runner 207 with a restricion gate 208, a hot runner 214 with a restriction gate 215, and a hot runner 209 with a restriction gate 210. All the restriction gates 208, 215, 210 leading to the chilling cavity 213. Both the cavity part 204 and the core part 205 contain a cooling system 211. A first plastic 201 such as polypropylene, is positioned in the hot runner 207 and a part of the chilling cavity 213. A second plastic 203 also such as polypropylene, is positioned in the hot runner 214 and another part of the chilling cavity 213. A third plastic 202 also such as polypropylene, is positioned in the hot runner 209 and the remainder of the chilling cavity 213. The part of the first plastic 201, the second plastic 202, and the third plastic 203 which is positioned in the chilling cavity 213 makes up a molded product 212. The expressions first, second and third plastic neither refers to the order in which they are mentioned in this description nor refers to the order in which they are applied, but are used to differentiate and name three different masses of plastic in compliance with the wording of the claim language.

Figure 2:
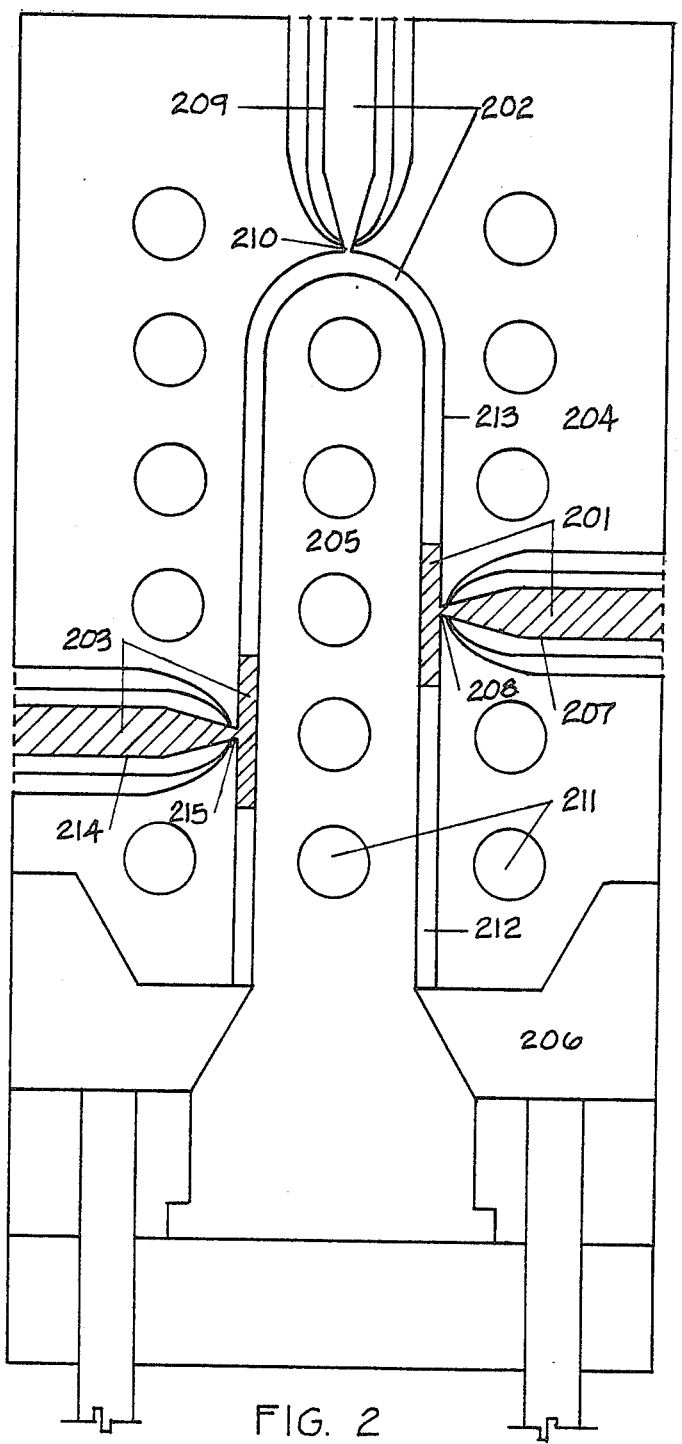

The operation of a second preferred embodiment of this invention as illustrated in FIG. 2 is as follows: A production cycle is started by injecting a hot molten plastic 201 and a hot molten third plastic 203 simultaneously from the hot runner 207 and the hot runner 214 respectively through the restriction gate 208 and the restriction gate 215 respectively, thereby entering the chilling cavity 213. The injection period of the hot molten plastic 101 and 103 is adjusted equally at a short period so that the cavity does not fill up and so that the first and third injected plastic 201 and 203 does neither obstruct injection from the second restriction gate 210, nor obstruct injection from each others restriction gates 208 and 215. The injected first and third plastic 201 and 203 respectively, is cooled by the cooling system 211, but before the injected first plastic 201 and injected third plastic 203 are completely solidified a hot molten second plastic 202 is injected from the second hot runner 209 through the second restriction gate 210 and thereby also enters the chilling cavity 213. The injection period of the hot molten second plastic 202 is adjusted at a longer period than the short period of the injection of the hot molten first and third plastic 201 and 203 respectively, whereby the injected second plastic 202 fills the cavity and fuses with the previously injected first and third plastic 201 and 203 respectively.

The first gate 208 and the second gate 215 are positioned on opposite sides of the core, whereby any movement of the core caused by the injection pressure of the first and third plastic 101 and 103 respectively, while this plastic is flowing into the cavity 213, is at least partly balanced and the movement thereby at least partly counteracted. It is possible in this fashion in some other embodiment to have three or more simultaneously injecting restriction cavities on different sides of the core which at least partly balance each other and which do not fill up the entire cavity.

Since the hot molten second plastic 202 is injected before the injected first and third plastic 201 and 203 respectively is completely solidified, the injected first and third plastic 201 and 203 respectively fuses better with the injected second plastic 202 and time is saved in the production cycle since it is not necessary to wait with injecting the hot molten secon plastic 102 until the injected first and second plastic 201 and 203 is completely solidified. Even though the hot molten second plastic 202 is injected before the injected first and third plastic 201 and 203 respectively is completely solidified, the partly solidified injected first and third plastic 201 and 203 respectively impedes any movement of the core part 205 caused by injecting the second hot molten plastic 202. The first second and third plastic 201, 202, and 203 respectively, are cooled in the chilling cavity 213 by the cooling system 211, thereby creating a solidified fused molded product 212. The molded product is ejected by the ejector sleeve 206 in the traditional manner for injection molding. The production cycle is hereafter repeated.

The operation of a third preferred embodiment of this invention is also illustrated in FIG. 2 and is as follows: A production cycle is started by injecting a hot molten third plastic 203 from the third hot runner 214 through the third restriction gate 215, thereby entering the chilling cavity 213. The injection pressure of the hot molten third plastic 203 in the third hot runner 214 is at a high level but the third restriction gate 215 has a small cross-sectional area which impedes the flow of the hot molten third plastic 203 through the restriction gate 215 so that the cavity 213 does not fill up and so that the injected third plastic 203 does not obstruct injection from the first restriction gate 208 and the second restriction gate 210. The injected third plastic is cooled by the cooling system 211, but before the injected third plastic 203 is completely solidified, a hot molten first plastic 201 is injected from the first hot runner 207 through the restriction gate 208 and thereby also enters the chilling cavity 213. The injection pressure of the hot molten first plastic 201 in the first hot runner 207 is at a high level like the injection pressure of the hot molten third plastic 203 in the third hot runner 214 and the first restriction gate 208 also has a small cross-sectional area which also impedes the flow of the hot molten first plastic 201 through the restriction gate 208 so that the cavity 213 does still not fill up, and the injected first plastic 201 does not obstruct injection from the second restriction gate 210. The injected first plastic 201 does not in this embodiment fuse with the previously injected third plastic 203, but in other embodiments this is possible. When the hot molten third platic 203 was injected into the chilling cavity 213, the flow was impeded by the small cross-sectional area of the third restriction gate 215, but even at this impeded flow the injected third plastic 203 causes a slight movement of the core part 205 in a direction away from the third restriction gate 215 in relation to the core part 204, but since the hot molten first plastic 201 is injected before the hot molten third plastic 203 is completely solidified, the core is forced back to its original central position by the injection pressure of the injected first plastic 201. As the core is forced back the cooled, not completely solidified injected third plastic 203 impedes the movement of the core part 205 caused by the injection pressure of the injected first plastic 201. Hereafter, a hot molten second plastic 202 is injected from the second hot runner 209 through the second restriction gate 210 and thereby also enters the chilling cavity 213.

The second restriction gate 210 does not have a small cross-sectional area so the flow of the second hot molten plastic 202 is not particularly impeded whereby the injected second plastic 202 fills the cavity and fuses with the previously injected third plastic 203 and previously injected first plastic 201. As the second hot molten plastic 202 is injected through the second restriction gate 210 into the chilling cavity 213, the cooled injected third and first plastic 203 and 201 respectively impedes any movement of the core part 205 caused by the pressure of the injected second plastic 202. The first, second and third injected plastic 201, 202 and 203 are now cooled in the chilling cavity 213 by the cooling system 211, thereby creating a solidified fused molded product 212. The molded product 212 is ejected by the ejector sleeve 206 in the traditional manner for injection molding. The production cycle is hereafter repeated.

While the above description contains many specificities, these should not be construed as limitations on the scope of the invention, but rather as an exemplification of some preferred embodiments thereof. Many other variations are possible, for example where the invention is used for the production of pipes. Usually the invention will be used in multicavity molds, and it is possible to use more than one gate through which to inject for the purposes explained in the descriptions. Accordingly, the scope of the invention should be determined not by the embodiments illustrated but by the appended claims and their legal equivalents.

I claim:

1. A method of cyclic injection molding of hollow plastic products, utilizing a mold chilling cavity with a core, in which the dimensions of the plastic products are controlled by stabilizing the core, wherein each production cycle comprises the steps of:
   (a) injecting a hot molten first plastic at a first temperature and a first pressure from at least a first runner through a first gate into the chilling cavity so that the cavity is not filled and so that the injected plastic does not obstruct injection from a second gate;
   (b) cooling the injected first plastic in the chilling cavity to thereby cool and at least partly solidify the first plastic;
   (c) injecting, subsequent to injecting the first plastic, a hot molten second plastic at a second temperature and a second pressure from a second runner through the second gate into the chilling cavity whereby the cooled injected first plastic is sufficiently cooled and at least partly solidified to stabilize the core by impeding any movement of the core caused by injecting the second plastic and whereby the injected second plastic fills the cavity and fuses with the previously injected plastic;
   (d) cooling the injected second plastic in the chilling cavity to thereby solidify the fused unit; and
   (e) ejecting the solidified molded unit of the hollow plastic product.

2. A method according to claim 1 wherein the injection pressure of the first plastic is less than the injection pressure of the second plastic.

3. A method according to claim 1 wherein the period of injecting the first plastic is less than the period of injecting the second plastic.

4. A method according to claim 1 wherein the first plastic has the same chemical composition as the second plastic.

5. A method according to claim 1 wherein the injection of the second plastic is started before the injected first plastic is completely solidified.

6. A method according to claim 1 comprising the additional step of:
   (f) injecting a third hot molten plastic at a third temperature and a third pressure from a third runner through a third gate into the chilling cavity so that the cavity is not filled and so that the injected third plastic does not obstruct injection from the first gate and second gate; and
   (g) cooling the injected third plastic in the chilling cavity to thereby solidify the third plastic.

7. A method according to claim 6 wherein the third hot molten plastic and the first hot molten plastic is injected simultaneously through the third gate and through the first gate respectively, and where said third gate and first gate are positioned on different sides of the core whereby any movement of the core caused by injecting the third plastic and the first plastic is at least partly counteracted.

8. A method according to claim 6 wherein the third hot molten plastic is injected prior to injecting the first plastic, and
   the method further comprising that the cooled injected third plastic impedes any movement of the core caused by injecting the first plastic.

9. A method according to claim 1 wherein the injection pressure of the first plastic in the first runner is approximately the same as the injection pressure of the second plastic in the second runner, but the first gate has a smaller cross-sectional area than the second gate whereby the cavity is not filled by the injected first plastic.

* * * * *